United States Patent [19]

Tin

[11] Patent Number: 4,549,273
[45] Date of Patent: Oct. 22, 1985

[54] MEMORY ACCESS CONTROL CIRCUIT

[75] Inventor: Kam B. Tin, Burnaby, Canada

[73] Assignee: AEL Microtel Limited, Calif.X

[21] Appl. No.: 448,448

[22] Filed: Dec. 10, 1982

[51] Int. Cl.⁴ .............................................. G06F 13/00
[52] U.S. Cl. .................................................... 364/200
[58] Field of Search ... 364/200 MS File, 900 MS File; 307/241, 243, 272 R; 340/825.5

[56] References Cited

U.S. PATENT DOCUMENTS

| 4,215,395 | 7/1980 | Bunyard et al. | 364/200 X |
| 4,237,534 | 12/1980 | Felix | 364/200 |
| 4,249,093 | 2/1981 | Henig | 307/241 X |
| 4,354,227 | 10/1982 | Hays | 364/200 |
| 4,354,262 | 10/1982 | Guézou | 364/200 |
| 4,423,384 | 12/1983 | De Bock | 307/243 X |

Primary Examiner—James D. Thomas
Assistant Examiner—Florin B. Munteanu-Ramnio
Attorney, Agent, or Firm—Gregory G. Hendricks

[57] ABSTRACT

A circuit which controls access of host and remote processors to a single memory. A first flip-flop indicates acceptance or refusal of the processor's memory access requests. A second flip-flop provides a wait signal to the host processor when the remote processor is accessing the memory. A gating circuit causes the first flip-flop to accept the remote processor's access request when both the host and remote processors request memory access at the same time.

6 Claims, 6 Drawing Figures

- HOST PROCESSOR ACTIVE
- REMOTE PROCESSOR ACTIVE
- HOST PROCESSOR READY
- REMOTE PROCESSOR READY
- HOST PROCESSOR WAIT

- HOST PROCESSOR ACTIVE
- REMOTE PROCESSOR ACTIVE
- HOST PROCESSOR READY
- REMOTE PROCESSOR READY
- HOST PROCESSOR WAIT

- HOST PROCESSOR ACTIVE
- REMOTE PROCESSOR ACTIVE
- HOST PROCESSOR READY
- REMOTE PROCESSOR READY
- HOST PROCESSOR WAIT

- HOST PROCESSOR ACTIVE
- REMOTE PROCESSOR ACTIVE
- HOST PROCESSOR READY
- REMOTE PROCESSOR READY
- HOST PROCESSOR WAIT

- HOST PROCESSOR ACTIVE
- REMOTE PROCESSOR ACTIVE
- HOST PROCESSOR READY
- REMOTE PROCESSOR READY
- HOST PROCESSOR WAIT

MEMORY ACCESS CONTROL CIRCUIT

FIELD OF THE INVENTION

The present invention relates to multiprocessor computer systems and more particularly to a circuit for controlling access to a single memory by host and remote processors.

BACKGROUND OF THE INVENTION

Memory circuits are often used as buffers to store data for use by multiple processors. In order to prevent erroneous address, data or control signals, and the resultant loss of integrity in the memory data, access to the memory must be controlled is such a manner as to ensure that only one processor has access to the memory at any particular time.

Such memory access control typically requires complex timing, priority and logic circuitry.

A circuit used for controlling access of dual input-output devices to a single controller was disclosed in U.S. Pat. No. 4,314,164 issued Feb. 2, 1982, to S. R. Norman and K. B. Tin. However, this circuit required the use of retriggerable monostable multivibrators and predetermined time slots.

Accordingly, it is the object of the present invention to provide a novel memory access control circuit which does not require the use of time slots or complex timing, priority and logic circuitry.

SUMMARY OF THE INVENTION

In accordance with the present invention, a memory access control circuit for use in a computer system is provided. The computer system includes a memory and host and remote processor, each of said processors being operative to provide a memory access request. The memory access control circuit comprises first and second storage means.

The first storage means is connected to the host and remote processors and it is operative in response to an absence of the remote processor memory access request to provide a host processor ready signal. It is further operative in response to the remote processor memory access request and an absence of the host processor memory access request to provide a remote processor ready signal. It is further operative in response to the host processor memory access request and a subsequent remote processor memory access request to provide the host processor ready signal. It is further operative in response to the remote processor memory access request and a subsequent host processor memory access request to provide the remote processor ready signal.

The second storage means is connected to the first storage means and the host and remote processors, and it is operative in response to the remote processor memory access request and the subsequent host processor memory access request to provide a host processor wait signal. The first storage means is further operative in response to simultaneous occurrence of the host and remote processor memory access requests to provide the remote processor ready signal and the second storage means is further operative in response to the simultaneous occurrence of the host and remote processor memory access requests to provide the host processor wait signal.

DESCRIPTION OF THE PREFERRED EMBODIMENT

Figure 1:
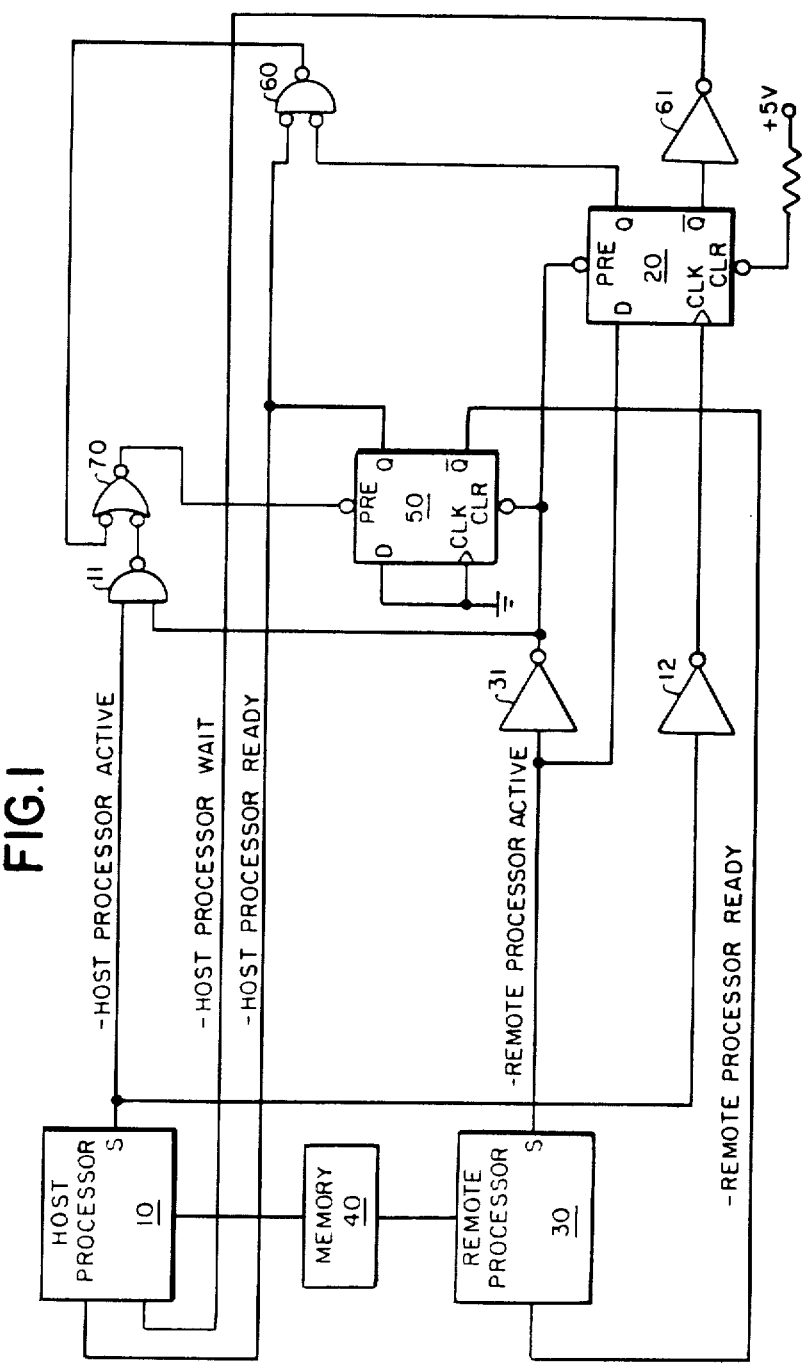
FIG. 1 of the accompanying drawing is a logic diagram of a memory access control circuit in accordance with the present invention.

Referring now to the accompanying drawing the memory access control circuit of the present invention is shown. The status (S) output of host processor 10 is connected to the first input of NAND gate 11 (first gating circuit) and to inverter 12 which is connected to the clock (CLK) input of D-type flip-flop 20. The S output of remote processor 30 is connected to inverter 31 and the data (D) input of D-type flip-flop 20. Both processors are also connected to memory 40. Inverter 31 is connected to the second input of NAND gate 11, the clear (CLR) input of D-type flip-flop 50 (first storage circuit) and the preset (PRE) input of D-type flip-flop 20 (second storage circuit). The D and CLK inputs of flip-flop 50 are connected to ground while the CLR input of flip-flop 20 is connected to a +5 volt source.

The Q and $\overline{Q}$ outputs of flip-flop 50 are connected to host processor 10 and remote processor 30, respectively. The Q output of this flip-flop is also connected to the first input of negative logic AND gate 60 (second gating circuit). The Q and $\overline{Q}$ outputs of flip-flop 20 are connected to the second input of negative logic AND gate 60 and to inverter 61, respectively. Negative logic AND gate 60 and NAND gate 11 are connected to the first and second inputs of negative logic OR gate 70, respectively. The output of this gate is connected to the PRE input of flip-flop 50.

Figure 2A:
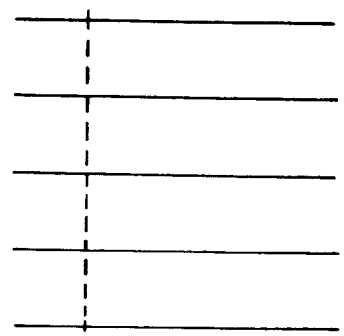
FIGS. 2a-2e of the accompanying drawing are timing diagrams for a memory access control circuit in accordance with the present invention.

When neither host processor 10 nor remote processor 30 is accessing memory 40, they provide logic level 1-HOST PROCESSOR ACTIVE and logic level 1-REMOTE PROCESSOR ACTIVE signals, respectively, at their status (S) outputs. A timing diagram for this condition is shown in FIG. 2a.

The logic level 1-REMOTE PROCESSOR ACTIVE signal is inverted to a logic level 0 signal by inverter 31 and applied to the CLR input of flip-flop 50, holding it in a reset state with a logic level 0-HOST PROCESSOR READY signal at its Q output. This signal informs host processor 10 that it can access memory 40. Thus the momory access control circuit defaults to a condition which gives immediate memory access to the host processor when neither processor is accessing the memory.

Figure 2B:
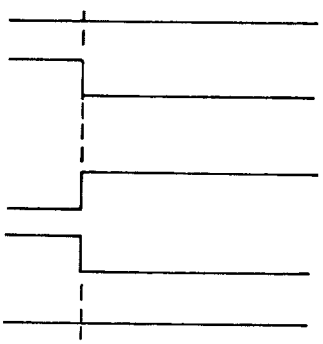

However, remote processor 30 is allowed to access memory 40 when host processor 10 is not accessing it. A timing diagram for this condition is shown in FIG. 2b. Under these conditions, the -HOST PROCESSOR ACTIVE signal remains at a logic level 1 while the -REMOTE PROCESSOR ACTIVE signal becomes a logic level 0 (remote processor memory access request). Inverter 31 inverts this logic level 0 signal to a logic level 1 and applies it to the CLR input of flip-flop 50, thereby removing the logic level 0 signal that held flip-flop 50 reset. The logic level 1 signal from inverter 31 is also applied to the second input of NAND gate 11. Since the -HOST PROCESSOR ACTIVE signal is still at a logic level 1, NAND gate 11 applies a logic level 0 (first preset) signal to the second input of negative logic OR gate 70. This gate then applies a logic level 0 signal to the PRE input of flip-flop 50, causing it to set and provide a logic level 0-REMOTE PROCESSOR READY signal at its $\overline{Q}$ output. This logic level 0 signal informs remote processor 30 that it can access memory 40. Flip-flop 50 also provides a logic level 1-HOST PROCESSOR READY signal at its Q output. This signal inhibits host processor 10 from accessing the memory.

Figure 2C:
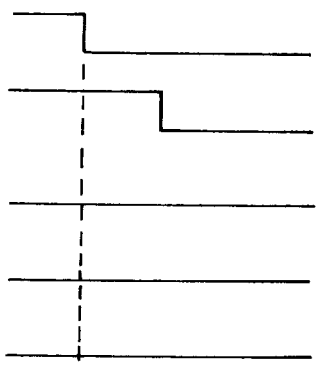

Conversely, remote processor 30 is not allowed to access memory 40 when host processor 10 is already accessing it. A timing diagram for this condition is shown in FIG. 2c. Under these conditions, the -HOST PROCESSOR ACTIVE signal is already at a logic level 0 (host processor memory access request) when the -REMOTE PROCESSOR ACTIVE signal becomes a logic level 0. Inverter 31 then applies a logic level 1 signal to the CLR input of flip-flop 50, thereby removing the logic level 0 signal that held flip-flop 50 reset.

The logic level 0-HOST PROCESSOR ACTIVE signal causes NAND gate 11 to apply a logic level 1 signal to the second input of negative logic OR gate 70. A logic level 1 signal also appears at the first input of negative logic OR gate 70. Negative logic AND gate 60 provides this signal in response to the logic level 1 signal appearing at the Q output of flip-flop 20. This flip-flop was set in response to the appearance of a logic level 0 signal at its PRE input. Inverter 31 provided this logic level 0 signal by inverting the logic level 1-REMOTE PROCESSOR ACTIVE signal which appeared at the S output of remote processor 30 prior to the current memory access request.

Therefore, logic level 1 signals appear at both inputs of negative logic OR gate 70, causing it to apply a logic level 1 signal to the PRE input of flip-flop 50. A logic level 1 signal appearing at the PRE input of a flip-flop has no effect, so flip-flop 50 does not change state and the -HOST PROCESSOR READY signal remains a logic level 0, thereby allowing host processor 10 to continue accessing memory 40. Flip-flop 50 also provides a logic level 1-REMOTE PROCESSOR READY signal at its $\overline{Q}$ output, thereby inhibiting the attempt by remote processor 30 to access memory 40.

Figure 2D:
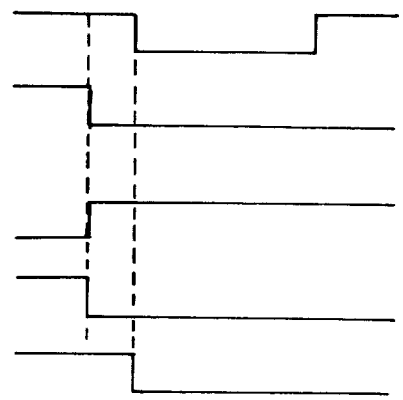

Any attempt by host processor 10 to access memory 40 when remote processor 30 is already accessing it is also inhibited. A timing diagram for this condition is shown in FIG. 2d. Under these conditions, remote processor 30 is initially accessing memory 40 so the -REMOTE PROCESSOR ACTIVE signal is at a logic level 0 and the -HOST PROCESSOR ACTIVE signal is at a logic level 1. Consequently, flip-flop 50 is set, thereby causing logic level 0-REMOTE PROCESSOR READY and logic level 1-HOST PROCESSOR READY signals to appear at its Q and $\overline{Q}$ outputs, respectively. A description of how these -HOST PROCESSOR ACTIVE and -REMOTE PROCESSOR ACTIVE signals cause flip-flop 50 to set, was previously provided with reference to remote processor 30 accessing memory 40 when host processor 10 was not accessing it.

When host processor 10 subsequently attempts to access memory 40, the -HOST PROCESSOR ACTIVE signal becomes a logic level 0. This signal causes NAND gate 11 to apply a logic level 1 signal to the second input of negative logic OR gate 70. A logic level 1 signal from negative logic AND gate 60 also appears at the first input of negative logic OR gate 70 since flip-flop 20 remains set with a logic level 1 at its Q output. Therefore, negative logic OR gate 70 applies a logic level 1 signal to the PRE input of flip-flop 50. This signal has no effect and flip-flop 50 remains set with a logic level 0-REMOTE PROCESSOR READY signal appearing at its $\overline{Q}$ output.

Inverter 12 inverts the logic level 0-HOST PROCESSOR ACTIVE signal to a logic level 1 and applies it to the CLK input of flip-flop 20. A logic level 0 signal also appears at the D input of flip-flop 50 because the -REMOTE PROCESSOR ACTIVE signal is at a logic level 0. Therefore, flip-flop 20 is clocked by the logic level 1 signal appearing at its CLK input and the logic level 0 signal appearing at its D input causes a logic level 1 signal to appear at its $\overline{Q}$ output. Inverter 61 then applies a logic level 0-HOST PROCESSOR WAIT signal to host processor 10. This signal informs host processor 10 that remote processor 30 is accessing memory 40 and causes host processor 10 to go into a wait state.

When remote processor 30 finishes its access of memory 40, the -REMOTE PROCESSOR ACTIVE signal returns to a logic level 1. This signal is inverted to a logic level 0 by inverter 31 and applied to the CLR input of flip-flop 50 and the PRE input of flip-flop 20, thereby causing flip-flops 50 and 20 to reset and set, respectively. When flip-flop 50 resets it provides a logic level 0-HOST PROCESSOR READY signal at its Q output. When flip-flop 20 sets, it provides a logic level 0 signal at its $\overline{Q}$ output. This signal is inverted to a logic level 1-HOST PROCESSOR WAIT signal by inverter 61. Thus host processor 10 is informed that it need not remain in a wait state and that it can access memory 40.

Figure 2E:
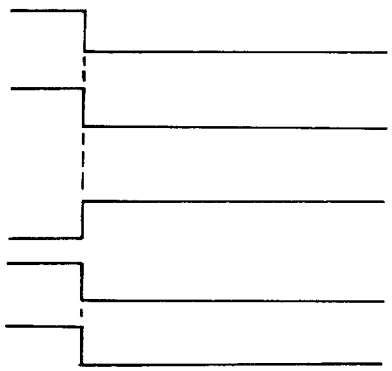

If both host processor 10 and remote processor 30 attempt to access memory 40 at the same time, remote processor 30 is given priority. A timing diagram for this condition is shown in FIG. 2e. Before this simultaneous memory access attempt occurs, the -HOST PROCESSOR ACTIVE and -REMOTE PROCESSOR ACTIVE signals are both at a logic level 1. The -REMOTE PROCESSOR ACTIVE signal is inverted to a logic level 0 and applied to the CLR and PRE inputs of flip-flops 50 and 20, respectively. This results in logic level 0-HOST PROCESSOR READY and logic level 1-HOST PROCESSOR WAIT signals, respectively. The -HOST PROCESSOR ACTIVE and -REMOTE PROCESSOR ACTIVE signals then simultaneously become logic level 0 signals. The -REMOTE PROCESSOR ACTIVE signal is inverted to a logic level 1 by inverter 31, thereby removing the signal that holds flip-flops 50 and 20 reset and set, respectively. The logic 0-REMOTE PROCESSOR ACTIVE signal also appears at the D input of flip-flop 20. The logic level 0-HOST PROCESSOR ACTIVE signal is inverted to a logic level 1 by inverter 12 and applied to the CLK input of flip-flop 20. Flip-flop 20 is then clocked by the logic level 1 signal appearing at its CLK input, and the logic level 0 signal appearing at its D input causes logic level 0 and 1 signals to appear at its Q and $\overline{Q}$ outputs, respectively. The logic level 1 signal at the $\overline{Q}$ output is inverted to a logic level 0-HOST PROCESSOR WAIT signal by inverter 61 and applied to host processor 10 to cause it enter a wait state. The logic level 0 signals from the Q output of flip-flops 50 and 20 appear at the inputs of negative logic AND gate 60 which then applies a logic level 0 (second preset) signal to the first input of negative logic OR gate 70. This gate then applies a logic level 0 signal to the PRE input of flip-flop 50, causing it to set and provide a logic level 0-REMOTE PROCESSOR READY signal at its $\bar{Q}$ output and a logic level 1-HOST PROCESSOR READY signal at its Q output. Thus, host processor 10 is informed by the logic level 0-HOST PROCESSOR WAIT signal that it should go into a wait state and remote processor 30 is informed by the logic level 0-REMOTE PROCESSOR READY signal that it can access memory 40.

Thus the memory access control circuit of the present invention controls access of host and remote processors to a single memory. It also causes the host processor to go into a wait state in the event of simultaneous memory access attempts.

It will be obvious to those skilled in the art that numerous modifications of the present invention can be made without departing from the spirit of the invention which shall be limited only by the scope of the claims appended hereto.

What is claimed is:

1. A memory access control circuit used in a computer system including a memory and a host processor and a remote processor, each of said processors operative to provide a memory access request, said memory access control circuit comprising:
   first storage means connected to said host processor and remote processor and operative in response to an absence of said remote processor memory access request to provide a host processor ready signal;
   further operative in response to said remote processor memory access request and an absence of said host processor memory access request to provide a remote processor ready signal;
   further operative in response to said host processor memory access request and a subsequent remote processor memory access request to provide said host processor ready signal;
   further operative in response to said remote processor memory access request and a subsequent host processor memory access request to provide said remote processor ready signal; and
   second storage means connected to said first storage means and said host and remote processors, and operative in response to said remote processor memory access request and said subsequent host processor memory access request to provide a host processor wait signal;
   said first storage means further operative in response to simultaneous occurrence of said host and remote processor memory access requests to provide said remote processor ready signal;
   said second storage means further operative in response to said simultaneous occurrence of said host and remote processor memory access requests to provide said host processor wait signal.

2. A memory access control circuit as claimed in claim 1, wherein said first storage means comprises:
   gating means connected to said host processor and remote processor; and
   a first flip-flop having a preset input connected to said gating means and a clear input connected to said remote processor, said first flip-flop operative in response to an absence of said remote processor memory access request, to reset and provide said host processor ready signal;
   said gating means operative in response to said remote processor memory access request and an absence of said host processor memory access request to provide a first preset signal;
   said first flip-flop operative in response to said first preset signal, to set and provide said remote processor ready signal.

3. A memory access control circuit as claimed in claim 2, wherein said second storage means comprises:
   a second flip-flop having a preset and a data input, both connected to said remote processor, and a clock input connected to said host processor;
   said second flip-flop operative in response to an absence of said remote processor memory access request to set and inhibit said host processor wait signal; and
   further operative in response to said host processor memory access request signal and said remote processor memory access request signal to reset and provide said host processor wait signal and a wait status signal.

4. A memory access control circuit as claimed in claim 3, wherein: said gating means is connected to said first and second flip-flops and operative in response to said host processor ready signal and said wait status signal to provide a second present signal;
   said first flip-flop further operative in response to said second preset signal to set and provide said remote processor ready signal.

5. A memory access control circuit as claimed in claim 4, wherein said gating means comprises:
   a first AND function gate operative to provide said first preset signal; and
   a second AND function gate operative to provide said second preset signal.

6. A memory access control circuit as claimed in claim 5, wherein said gating means further comprises: an OR function gate connected between said first flip-flop and said first and second AND function gates and operative to gate said first and second preset signals to said first flip-flop.

* * * * *